(12) United States Patent
Zapata (10) Patent No.: US 10,858,101 B2
(45) Date of Patent: Dec. 8, 2020

(54) DEVICE AND SYSTEM FOR PROPELLING A PASSENGER

(71) Applicant: ZIPH20, Le Rove (FR)

(72) Inventor: Frankie Zapata, Le Rove (FR)

(73) Assignee: ZIPH20, Le Rove (FR)

(*) Notice: Subject to any disclaimer, the term of this patent is extended or adjusted under 35 U.S.C. 154(b) by 0 days.

(21) Appl. No.: 16/347,708

(22) PCT Filed: Nov. 7, 2017

(86) PCT No.: PCT/EP2017/078514
§ 371 (c)(1),
(2) Date: May 6, 2019

(87) PCT Pub. No.: WO2018/083354
PCT Pub. Date: May 11, 2018

(65) Prior Publication Data
US 2019/0256174 A1   Aug. 22, 2019

Related U.S. Application Data

(60) Provisional application No. 62/418,750, filed on Nov. 7, 2016.

(30) Foreign Application Priority Data

Jun. 6, 2017   (FR) .................................... 17 55013

(51) Int. Cl.
*B63H 11/00*   (2006.01)
*B64C 39/02*   (2006.01)
(Continued)

(52) U.S. Cl.
CPC ............ *B64C 39/026* (2013.01); *A63B 35/12* (2013.01); *B63B 34/10* (2020.02); *B63H 11/00* (2013.01);
(Continued)

(58) Field of Classification Search
CPC ....... B64C 39/026; B63B 34/10; A63B 35/12; B63H 11/00; B63H 11/04; B63H 11/08; B63H 11/113
See application file for complete search history.

(56) References Cited

U.S. PATENT DOCUMENTS 3,356,056 A * 12/1967 Lehmann .................. B63G 8/32
114/317
4,050,631 A *  9/1977 Syltebo ................... F02K 1/006
239/265.25
(Continued)

FOREIGN PATENT DOCUMENTS

WO   2010030411 A1   3/2010
WO   2010039952 A1   4/2010
(Continued)

OTHER PUBLICATIONS

International Search Report (PCT/ISA/210) dated Feb. 19, 2018, by the European Patent Office as the International Searching Authority for International Application No. PCT/EP2017/078514.
(Continued)

*Primary Examiner* — Stephen P Avila
(74) *Attorney, Agent, or Firm* — Buchanan Ingersoll & Rooney PC (57) ABSTRACT

The invention relates to a propulsion device comprising a platform that is arranged so as to accommodate a passenger and cooperates with a thrust unit comprising a main nozzle, advantageously oriented from the bow to the stern of the device, and two secondary nozzles that are lateral and are positioned essentially at the bow of the propulsion device. The secondary nozzles are mounted so as to be mobile about a transverse axis so as to be moved by actuators controlled by a processing unit that implements a method for controlling the secondary nozzles, thus providing automatic control assistance to the passenger.

5 Claims, 6 Drawing Sheets

(51) Int. Cl.
*B63H 11/113* (2006.01)
*A63B 35/12* (2006.01)
*B63B 34/10* (2020.01)
*B63H 11/04* (2006.01)
*B63H 11/08* (2006.01)
*B64C 25/54* (2006.01)

(52) U.S. Cl.
CPC ............ *B63H 11/04* (2013.01); *B63H 11/08* (2013.01); *B63H 11/113* (2013.01); *B64C 25/54* (2013.01); *B63H 2011/006* (2013.01); *B63H 2011/081* (2013.01)

(56) References Cited

U.S. PATENT DOCUMENTS

| | | | |
|---|---|---|---|
| 6,086,436 A * | 7/2000 | Ishigaki | B63H 11/10 440/38 |
| 7,258,301 B2 | 8/2007 | Li | |
| 8,336,805 B1 | 12/2012 | Zapata | |
| 8,608,104 B2 | 12/2013 | Zapata | |
| 9,751,597 B1 | 9/2017 | Low | |
| 2005/0042951 A1* | 2/2005 | Morvillo | B63H 25/46 440/100 |
| 2008/0014811 A1 | 1/2008 | Zeyger | |
| 2010/0030411 A1 | 2/2010 | Wilson et al. | |
| 2011/0172858 A1 | 7/2011 | Gustin et al. | |
| 2013/0203306 A1 | 8/2013 | Zapata | |
| 2014/0103165 A1 | 4/2014 | Zapata | |
| 2014/0216319 A1 | 8/2014 | Frisky | |
| 2015/0028161 A1 | 1/2015 | Parks | |
| 2015/0103165 A1 | 4/2015 | Logvinov et al. | |
| 2017/0080997 A1 | 3/2017 | Zapata | |

FOREIGN PATENT DOCUMENTS

| | | |
|---|---|---|
| WO | 2013041787 A1 | 3/2013 |
| WO | 2015132478 A1 | 9/2015 |
| WO | 2016130022 A1 | 8/2016 |

OTHER PUBLICATIONS

Written Opinion (PCT/ISA/237) dated Feb. 19, 2018, by the European Patent Office as the International Searching Authority for International Application No. PCT/EP2017/078514.

Office Action issued by the U.S. Patent and Trademark Office in the U.S. Appl. No. 16/922,816, dated Aug. 10, 2020, U.S. Patent and Trademark Office, Alexandria, VA. (11 pages).

Office Action issued by the U.S. Patent and Trademark Office in the U.S. Appl. No. 16/750,291, dated Jul. 28, 2020, U.S. Patent and Trademark Office, Alexandria, VA. (7 pages).

* cited by examiner

DEVICE AND SYSTEM FOR PROPELLING A PASSENGER

The invention relates to a device and a system for propulsion of a passenger in such a way that he can move in the air and/or on the surface of a fluid, with very high freedom of movement independently of his natural agility and his physique.

As a preferred application, the propulsion device and system according to the invention will be implemented on the surface of water.

The invention thus provides that the system is very simple to implement and accessible to as many as possible.

Nowadays, water sports are very popular because of their fun side and because of the sensations they provide. Various propulsion devices have been designed to make it possible for people to move on or under the surface of water.

Figure 1:
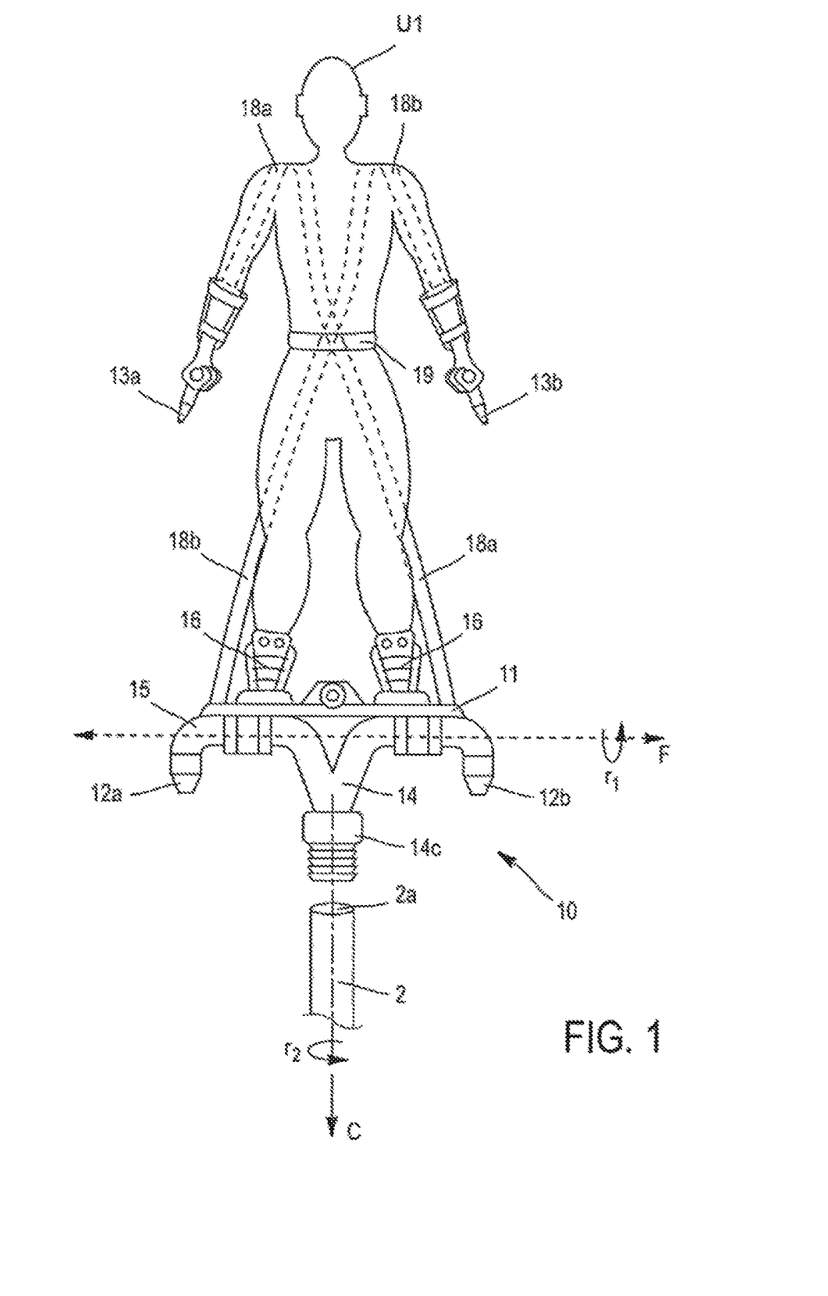
FIG. 1, described above, illustrates a first embodiment of a propulsion device known from U.S. Pat. Nos. 8,336,805 and 8,608,104.

FIG. 1 shows a first embodiment of a propulsion device 10 as described in U.S. Pat. No. 8,336,805 or 8,608,104. A device of this type allows its user to perform moves which are thus far unequaled. For this purpose, said user makes use of his physique to cause multiple trajectories, such as loop-the-loops. He can even simulate the progress of a dolphin, thus describing a sinusoidal trajectory while being alternately underwater and above water, like said aquatic mammal. This propulsion device 10 comprises a main body in the form of a platform 11 on which a passenger U1 may position himself. The propulsion device, described in connection with FIG. 1, comprises a thrust unit cooperating with said platform 11, consisting of a pair of main nozzles 12a and 12b fixed against the lower face of the platform 11. According to FIG. 1, the thrust unit of a device of this type may further comprise two secondary nozzles 13a and 13b to facilitate the handling thereof. These are free and are intended to be optionally respectively held by a passenger U1 at the forearms or hands. To deliver a sufficient thrust force and to enable a take-off followed by a displacement, the propulsion device 10 comprises means 14 for collecting and distributing a fluid under pressure, for example water, to the main nozzles, or to the secondary nozzles if present. A fluid of this type is preferably conveyed via a flexible supply duct 2 from a remote compression station, not shown in FIG. 1. A supply duct of this type may be formed from a fire hose or from any other means and/or equipment having the necessary resistance to the pressure exerted by the pressurized fluid. The means 14 for collecting and distributing a fluid under pressure, which will be referred to for simplicity as a "collector," may thus exhibit a base 14c to which a socket 2a of a supply duct 2 is connected, for example via a spline designed to receive said duct 2. According to FIG. 1, the collector 14 may exhibit a Y-like shape, so as to collect the fluid under pressure from the base 14c and distribute it via the arms to the main nozzles 12a and 12b. The collector 14 is connected to the main nozzles via an optional elbow 15 so as to orient said main nozzles along an axis substantially perpendicular to the lower face of the platform 11. The arms are connected to said main nozzles in a pivot connection. An arrangement of this type enables free rotation r1 about an axis F substantially parallel to said arms, modulo the stop formed by the lower face 11b of the platform 11 in the event of excessive tilting of said platform. A pivot connection of this type allows the user to "take off" easily from the surface of the water and gives him a high capacity for orientation and movement. The end piece 2a of the supply duct 2 may advantageously cooperate with the collector 14 at the base 14c thereof, likewise in a pivot connection, so as to enable free rotation r2 about an axis C substantially parallel to the duct 2. The device may thus pivot freely about said axis C without causing buckling or excessive strain on the supply duct 2.

To distribute the fluid under pressure to the secondary nozzles 13a and 13b, by way of example and as shown in FIG. 1, secondary ducts 18a and 18b, in the advantageous form of flexible pipes, may be provided to deliver said fluid under pressure from the collector 14 to the secondary nozzles. So as not to hinder the passenger U1, said secondary ducts may be guided along the back to the shoulders of said passenger U1 using holding means 19, such as straps, harnesses etc. Said passenger U1 may further use means for restraining the secondary nozzles on his forearms.

The platform 11 may exhibit means for holding a passenger on the upper face thereof. Thus, according to the preferred position of a passenger on the platform 11, said holding means may consist, as shown in FIG. 1, of a pair of shoes, of foot straps, or of fixing boots 16 of a type similar to those found for example in wakeboarding.

A propulsion device 10 of this type may be supplied by any remote fluid compression station as soon as said station is capable of delivering a fluid at a sufficient pressure to support the operation of the propulsion device 10. A compression station of this type may consist of a suitable motorized watercraft ("MWC" hereinafter), as described in particular in WO2013/041787A1.

Although the propulsion device 10 described in connection with FIG. 1 makes it possible to move easily in and/or on the surface of the water and offers its user a very high degree of freedom for performing various acrobatic moves, it may have some drawbacks for some users. First, the configuration of the nozzles at the bottom of the platform 11 favors substantially vertical movement and does not allow rapid movement substantially parallel to the surface of the water: the movement speed is thus limited, reducing the sensations of a passenger in pursuit of high performances. Moreover, when this passenger U1 wishes to move along the surface of the water, he has to provide a non-negligible effort to tilt the platform, since the configuration of the nozzles at the bottom of the platform naturally causes a vertical movement. As a result, the equilibrium position for achieving the desired movement is often difficult to maintain, and very quickly becomes tiring for the passenger. Finally, although the sensations provided are fantastic, they require a small amount of training which is sometimes very unrewarding, or even prohibitive, for a beginner, before he can experience the aforementioned pleasures and sensations. For some, including those who are not comfortable in an aquatic environment, a propulsion device 10 of this type may be considered unsuitable for a new leisure activity providing access to immediate enjoyment.

Figure 2:
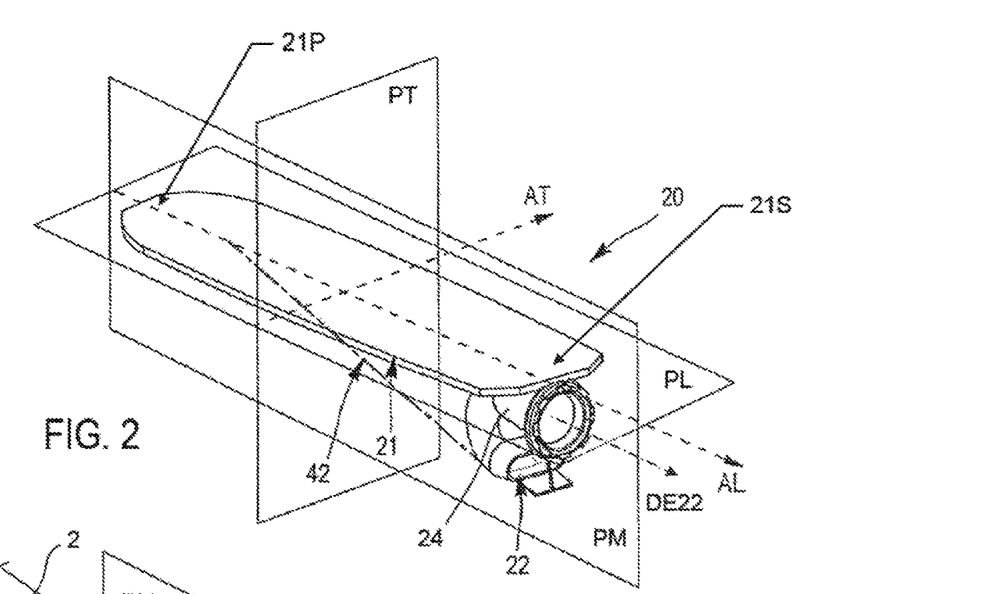
FIG. 2, described above, illustrates a second embodiment of a known propulsion device, drawn from WO 2015/132478 A1.

To increase the speed of horizontal movements and to reduce the tiredness constraints on the passenger, a second propulsion device was designed. It is described in particular in WO 2015/132478 A1. As is shown in FIG. 2, a propulsion device 20 of this type is designed to limit or even remove any constraints connected to performing a water sport that is very similar to surfing and that, unlike its forebears, can be performed on any body of water regardless of the local weather. A propulsion device 20 of this type comprises a platform 21 on which a passenger positions himself, not shown in FIG. 2. Said platform 21 cooperates with means 24 to collect a pressurized fluid and distribute it to a main nozzle 22, which expels said fluid from a fluid outlet in a given direction DE22, said means 24 being supplied with pressurized fluid by a fluid supply duct (not shown in FIG. 2). A supply duct of this type could be similar to the duct 2 described previously in connection with FIG. 1. Said main nozzle 22 is oriented substantially from the bow 21P towards the stern 21S of the platform 21, in such a way that the fluid expulsion direction DE22 lies in a median plane PM of the platform 21, said median plane PM separating a port half of said platform 21 from a starboard half, said halves not necessarily being equal. As for the means for collecting and distributing a fluid 24, these cooperate with the platform 21 in an embedded connection. The propulsion device 20 may advantageously comprise one or more reinforcement bars 42, which advantageously cooperate with the platform 21 and the main nozzle 22. The presence of an arm 42 of this type makes it possible to reduce greatly the dimensions of the platform 21, in particular the thickness and width thereof, since said arm cushions the bending of the platform 21. As well as said median plane PM, FIG. 2 also defines a transverse plane PT of a propulsion device 20 of this type, consisting of any plane normal to said median plane PM that separates the platform 21 into two halves, one comprising the bow 21P of said platform 21 and the other comprising the stern S1 thereof, said halves not necessarily being equal. In the same way, said FIG. 2 defines a longitudinal plane PL of a propulsion device 20 of this type. Said plane consists of any plane normal to the transverse and median planes, said longitudinal plane PL separating an upper half of said platform 21 from a lower half of said platform 21, said halves not necessarily being equal. Finally, FIG. 2 also shows a transverse axis AT, consisting of an axis belonging both to a transverse plane PT and to a longitudinal plane PL, as well as a longitudinal axis AL, an axis of this type belonging both to a median plane PM and to a longitudinal plane PL.

Like the first propulsion device 10 shown in FIG. 1, the second propulsion device 20 described in connection with FIG. 2 requires some skill from the user thereof to master the platform 21 and to manage to progress over the surface of the water rapidly and without training. In particular, the very high freedom of trajectories offered by these two first propulsion devices 10 and 20 is not generally synonymous with control or ease of progression for a novice user.

Prior to the two propulsion devices 10 and 20, a third propulsion device, not described in the present drawings, was designed. A propulsion device of this type is depicted in particular in U.S. Pat. No. 7,258,301 or US 2008/0014811. A beginner user of a third propulsion device of this type is indeed constrained and limited in his progression, but the use of said third device is intended to involve less training. A third propulsion device of this type comprises a main body in the form of a harness or seat, against which or in which a passenger can position himself. A body of this type cooperates integrally with a thrust unit, in the form in particular of a pair of nozzles, to eject a fluid under pressure and thus to generate a thrust force. To simplify the passenger's flight and to reduce the physical effort involved, the nozzles are arranged below the center of gravity of the body/passenger system, more specifically at the passenger's shoulders. The configuration of the nozzles, located below the center of gravity of the propulsion device, gives the passenger the impression of being suspended by a virtual crane hook at the shoulders, greatly reducing the physical exertions of the passenger. Means making it possible to orient said nozzles determine the trajectory of the propulsion device, but the steering is still unintuitive for the passenger. Moreover, the take-off phases in particular require an initial standing position of the passenger with his feet on a solid support, making it virtually impossible to take off again from an underwater position off the coast for example. The physical effort of the passenger is indeed reduced to its most simple expression in order to move, but this benefit greatly limits his freedom and the variety of movements and displacements on the surface of the water. Moreover, according to this technical teaching, a remote compression station is also made use of to compress water and thus to supply this third propulsion device with a pressurized fluid. Said pressurized fluid is also conveyed via a supply duct such as a fire hose. However, this is a dedicated compression station, unlike those associated with the first two aforementioned propulsion devices 10 and 20. A dedicated station of this type increases the cost of a solution of this type.

The invention makes it possible to address the vast majority of the drawbacks presented by the known solutions.

The numerous advantages provided by a device according to the invention include making it possible:
  to provide users with a very fun device that, after quick training, is very easy to use and offers a wide variety of applications and trajectories;
  to have the ability to take off and to steer without having to draw on one's physical condition;
  to control or program, depending on the selected embodiment, a nominal altitude, the user merely simply having to orient himself horizontally;
  to provide a propulsion device having a wide variety of movements that offers, safely and without tiredness, good sensations and high satisfaction starting from the first minutes of use.

For this purpose, in particular a propulsion device is provided comprising:
  a platform arranged in such a way that a passenger can position himself there;
  a thrust unit;
  means for collecting and distributing a pressurized fluid to said thrust unit, said means being supplied with pressurized fluid by a supply duct and cooperating with the platform in an embedded connection.

So as to control the attitude and altitude of a longitudinal plane of said propulsion device, and ultimately to provide automatic assisted control thereof to the user thereof, the thrust unit comprises two secondary nozzles that cooperate in a fluid connection with said means for collecting and distributing a pressurized fluid, so as to be supplied with pressurized fluid, said secondary nozzles being mounted movably, each about a transverse axis of said propulsion device, said axis being normal to a first median plane of the propulsion device, said first median plane separating a port half from a starboard half of said propulsion device, to deliver said pressurized fluid in respective fluid directions lying in distinct second median planes, parallel to said first median plane of the propulsion device in which the fluid direction of the main nozzle lies. Further, the secondary nozzles are positioned substantially at the bow of said propulsion device.

In a preferred but non-limiting embodiment, so as to be able to move a propulsion device according to the invention substantially horizontally, the thrust unit thereof may comprise a main nozzle that expels a fluid from a fluid outlet in a given direction, said main nozzle being oriented substantially from the bow towards the stern of the propulsion device in such a way that said fluid expulsion direction lies in a median plane of the propulsion device, said median plane separating a port half from a starboard half of said propulsion device, said main nozzle of the thrust unit being positioned substantially at the stern of the propulsion device.

In order for a propulsion device of this type not to experience any constraint from the pressurized fluid supply duct, the means for collecting and distributing a pressurized fluid may cooperate with said supply duct in a pivot connection at the proximal part of said duct.

In a preferred embodiment, the platform may comprise a rigid framework, buoyancy elements, a fairing, a seat on which the passenger may position himself.

To facilitate a passenger boarding a propulsion device according to the invention and ultimately to promote the take-off thereof, the buoyancy elements may advantageously be arranged to keep the bow partially underwater when the propulsion device is positioned on the surface of a fluid and when said passenger is in a seated position on said seat, said passenger being of average build.

To move the secondary nozzles of the thrust unit automatically, a propulsion device according to the invention may comprise an actuator associated with each secondary nozzle that causes a rotation, about a transverse axis of the propulsion device, of the fluid expulsion direction of the secondary nozzle in question in one of said second median planes.

To command actuators of this type that are respectively associated with the secondary nozzles, they may be controlled by electric commands. In a preferred embodiment of this type, said propulsion device may further comprise a processing unit designed to generate said electric commands from a control instruction and/or from a baseline.

To make it possible for a user to modify the trajectory of a propulsion device according to the invention, it may advantageously comprise a man-machine interface designed to translate a gesture of said user into:
  a change-of-direction instruction in the form of an angular position with respect to the attitude of the longitudinal plane of the propulsion device about a longitudinal axis of said propulsion device; and/or
  a change-of-altitude instruction in the form of an angular position with respect to the attitude of the longitudinal plane of the propulsion device about a transverse axis of said propulsion device.

In this preferred embodiment, the baseline may express an attitude and a reference cruising altitude of a longitudinal plane of the propulsion device. In this case, a propulsion device of this type according to the invention may comprise:
  first and second sensors for measuring the respective angular positions of the secondary nozzles with respect to a reference angular position;
  a third sensor providing a measurement of the roll and/or a measurement of the pitch experienced by said longitudinal plane about a longitudinal axis and a transverse axis respectively of said propulsion device.

To improve the performance of a propulsion device according to the invention, in particular while preventing any unnecessary pressure loss in the distribution of the pressurized fluid, at least part of the means for collecting and distributing said pressurized fluid as well as the main nozzle of the thrust unit may have an oblong section.

A second subject matter of the invention relates to a propulsion system comprising a propulsion device as detailed above that cooperates with a remote compression station, said station supplying said propulsion device with pressurized fluid via the supply duct.

To reduce the acquisition and maintenance costs of a system of this type, the remote compression station may advantageously consist of a motorized watercraft comprising a hull, propulsion means that compress by turbining a fluid drawn in from an inlet and that expel said fluid that is thus placed under pressure from a fluid outlet at the rear of said vehicle.

A third subject matter of the invention relates to a method for controlling secondary nozzles of a propulsion device according to the invention. A method of this type makes it possible to provide automatic assisted control to any novice or advanced user. A method of this type is implemented by the processing unit of a propulsion device according to the invention. Said control method comprises:
  a step for producing a command to cause a shift in relative position of said secondary nozzles from the change-of-direction instruction and from the measurement of the roll of said propulsion device;
  a step for producing a command to modify an average position of said secondary nozzles from the change-of-altitude instruction and from the measurement of the pitch of said propulsion device;
  a step for producing:
    a command for controlling a first of the two secondary nozzles from a sum of the command to cause a shift in relative position of the secondary nozzles and the command to modify an average position of the secondary nozzles, which were generated beforehand;
    a command for controlling a second of said secondary nozzles by subtracting said command to cause a shift in relative position of the secondary nozzles from the command to modify an average position of the secondary nozzles;
  a step for generating and outputting a command that can be interpreted by the actuator associated with the first of said secondary nozzles from the measurement of the angular position of said first secondary nozzle and said command for controlling the first secondary nozzle that was generated previously;
  a step for generating and outputting a command that can be interpreted by the actuator associated with the second of said secondary nozzles from the measurement of the angular position of said second secondary nozzle and said command for controlling the second secondary nozzle that was generated previously.

As a preferred embodiment, one of the steps of a method of this type may advantageously consist in implementing a proportional integral derivative corrector.

To maximize the efficiency of the implementation of a method of this type, the first and second of said secondary nozzles may be positioned to port and to starboard respectively from the propulsion device.

Further features and advantages will become more clearly apparent upon reading the following description and examining accompanying drawings, in which.

In a first embodiment of a propulsion device 30 according to the invention, described in connection with FIGS. 3 to 9, a device 30 of this type comprises a main body in the form of a platform 31 of which only a framework is shown in FIGS. 3 to 6. Said framework cooperates with a fairing 31H, as shown by way of non-limiting example in FIGS. 7 to 9. Depending on the size of the platform 31 and the power of the remote compression station supplying said propulsion device 30 with pressurized fluid, said station not being shown for simplicity in said FIGS. 3 to 9 but merely shown in connection with FIG. 1, the invention provides that a plurality of passengers U1, U2 may optionally position themselves on said device 30 simultaneously. A configuration of this type is shown by way of non-limiting example in FIG. 9.

Figure 10:
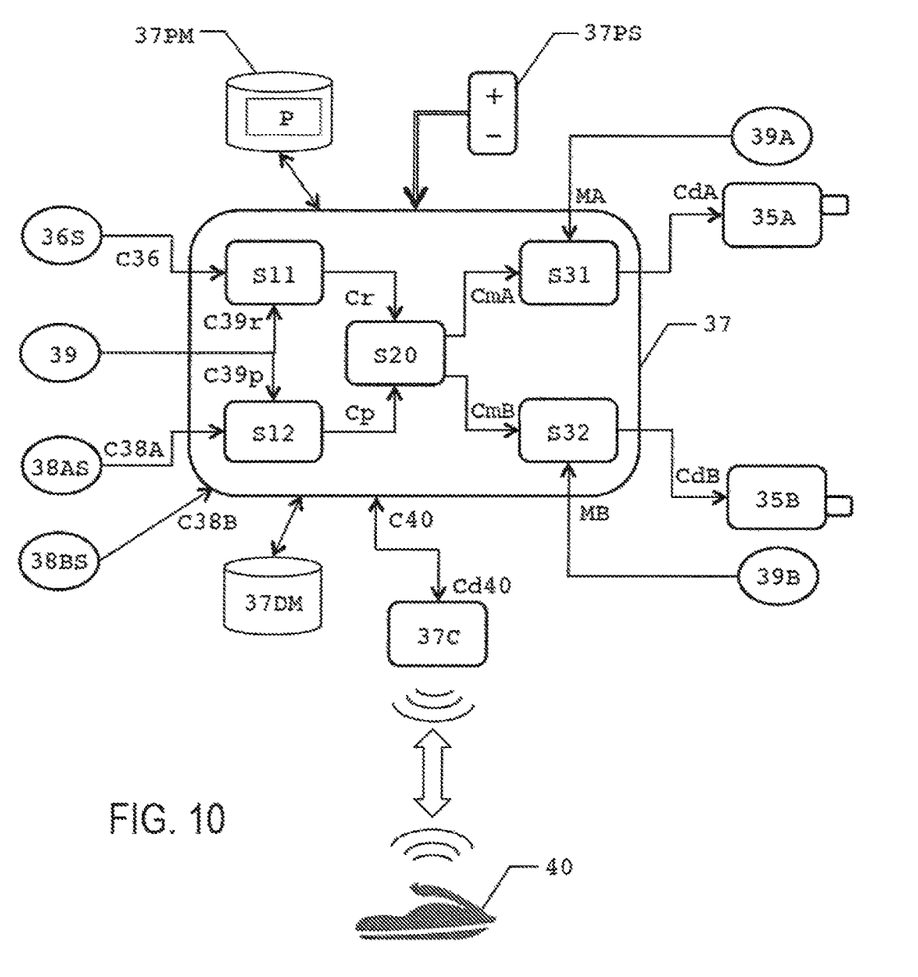
FIG. 10 shows a functional architecture of a processing unit of a preferred but non-limiting embodiment of a propulsion device according to the invention implementing a method for controlling the secondary nozzles of said propulsion device.

A remote compression station of this type, denoted as 40 in FIG. 10, may be a dedicated apparatus or an apparatus having an original primary function other than supplying a propulsion device with fluid under pressure. By way of example, the invention provides that a firefighting land vehicle or watercraft can be used as a remote compression station if it has a sufficient fluid compression capacity. Preferably, the invention proposes making use of the natural compression capacity of a motorized watercraft (MWC) such as the RUNABOUT MZR Edition 2011 from the manufacturer ZAPATA RACING.

A vehicle 40 of this type comprises a hull and accommodates propulsion means that compress by turbining a fluid on the surface of which the MWC navigates, said fluid being drawn in from an inlet arranged under the hull. Said fluid that is thus placed under pressure is expelled from a fluid outlet located at the rear or at the stern of the vehicle. A fluid outlet of this type is generally in the form of a directional cone for modifying the trajectory of the MWC. Propulsion means are generally driven by a thermal engine. So as to guarantee the use of the MWC as a remote compression station, a flange may be applied to the fluid outlet and then connected to an end piece of a supply duct 2 to convey the fluid under pressure that is expelled from the fluid outlet of the MWC. At the other end, the supply duct 2 is connected via an end piece 2*a* to means 34C for collecting the fluid under pressure of a propulsion device 30 according to the invention, as will be seen hereinafter.

Figure 3:
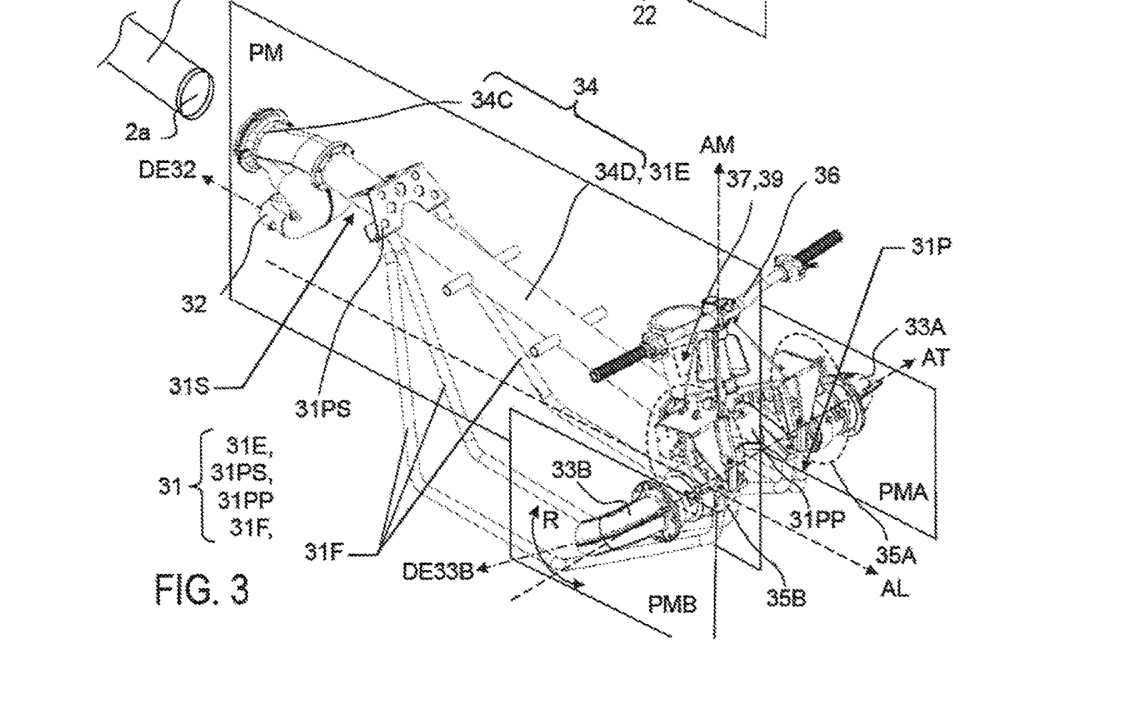
FIG. 3 is a perspective view of the frame of a preferred but non-limiting embodiment of a passenger propulsion device according to the invention.
Figure 4:
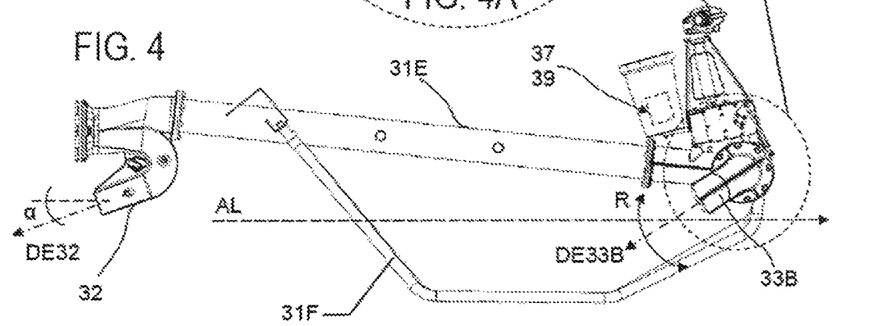
FIGS. 4 and 4A are a side view and an enlarged detail respectively of the frame of a preferred but non-limiting embodiment of a passenger propulsion device according to the invention.
Figure 5:
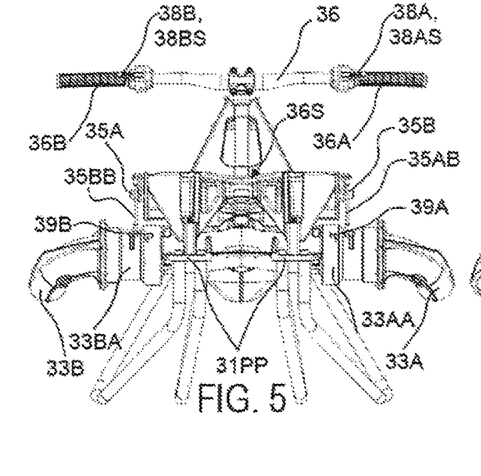
FIGS. 5 and 6 are front and rear views respectively of the frame of a preferred but non-limiting embodiment of a passenger propulsion device according to the invention.

According to FIG. 3, the platform 31 of a propulsion device 30 of this type according to the invention advantageously consists of a tubular structure comprising a plurality of tubes 31F and/or beams 31E, which are advantageously hollow to reduce the weight thereof. The role of said structure 31 is to realize a frame of the main body of the propulsion device 30. The materials that can be used to form a structure 31 of this type may be selected from aluminum, a stainless alloy, or even carbon fibers or any other suitable polymers, in other words more generally any material having functional features that promote lightness, robustness and chemical neutrality, in other words not causing a reaction when in contact with a liquid medium. As is shown in FIGS. 3 and 4, a tubular frame 31F of this type may comprise or cooperate with a beam or more generally a rigid, hollow main element 31E that accommodates or forms all or part of the means 34D for distributing a compressed fluid from a fluid inlet 34C, located at the stern 31S of the propulsion device 30, towards two secondary lateral nozzles 33A and 33B, which are themselves located at the stern 31P of said propulsion device 30. The tubular structure 31F can thus cooperate, in an embedded mechanical connection, with said main beam 31E, at the stern 31S of the propulsion device 30, with a plate 31PS that thus rests on or encloses said beam 31E, as is shown in FIG. 3. At the bow 31P, the tubular structure 31F cooperates with a second plate 31PP, optionally comprising one or more integral parts, in an embedded mechanical connection, as is shown in FIGS. 3 and 5. Mechanical connections of this type, at the stern 31S and the bow 31P respectively, may consist of screw or bolt connections or even welded connections.

Like the known propulsion device 20 described in connection with FIG. 2, a propulsion device 30 according to the invention may be defined in terms of planes and/or axes, as is described in particular in FIG. 3. Thus, in the remainder of the description:

"median plane" PM, PMA or PMB denotes any plane normal to the propulsion device 30 separating a port half of said device 30 from a starboard half, said halves not necessarily being equal;

"transverse plane" denotes any plane normal to a median plane separating the propulsion device 30 into two halves, one comprising the bow 31P of said device 30 and the other comprising the stern 31S thereof, said halves not necessarily being equal;

"longitudinal plane" denotes any plane normal to transverse and median planes, said longitudinal plane separating an upper half of said device 30 from a lower half, said halves not necessarily being equal;

"transverse axis" AT denotes any axis belonging both to a transverse plane and to a longitudinal plane of the propulsion device 30;

"longitudinal axis" AL denotes any axis belonging both to a median plane and to a longitudinal plane of the propulsion device 30;

"median axis" AM denotes any axis belonging both to a median plane and to a transverse plane of the propulsion device 30.

A propulsion device 30 described in connection with FIGS. 3 to 9 comprises a thrust unit that cooperates with the platform 31.

In the present document, the term "nozzle" is used to define a profiled pipe element intended to increase the speed of a flowing fluid. An element of this type may also be characterized as a "jet." This increase in the speed of the fluid is mainly due to a difference in section between the inlet and outlet of the element, the section of the outlet being smaller than that of the inlet.

Figure 4A:
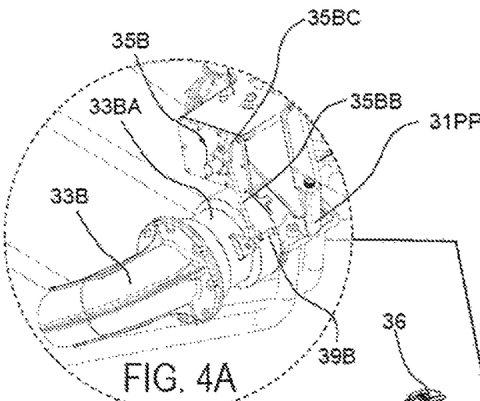

Thus, as is shown more precisely in FIGS. 3, 4, 4A and 5, the main body or platform 31 of the propulsion device 30 cooperates with two secondary nozzles 33A and 33B, mounted movably in rotation about a transverse axis AT, a projection of which into a longitudinal plane of the propulsion device 30 is normal to that of a longitudinal axis AL of said propulsion device 30 into said longitudinal plane. Said secondary nozzles 33A and 33B are positioned to port and to starboard respectively from the propulsion device 30. As is shown in FIG. 4A, which provides an enlarged detail of FIG. 4, the nozzle 33B located to starboard from the propulsion device 30 consists of a hollow tube, advantageously elbowed at substantially ninety degrees. A tube of this type cooperates in an embedded connection, for example by bolting or welding as shown in FIG. 4A, with an arm 33BA that is substantially straight and also hollow, having a lumen of a section that is advantageously circular and substantially identical to that of the secondary nozzle with which it cooperates, in this case the nozzle 33B. Said arm 33BA further cooperates in a mechanical pivot connection with a first distal part of the means 34D to distribute a compressed fluid. For its part, the secondary nozzle 33A located to port from the propulsion device 30 cooperates, like the nozzles 33B, with an arm 33AA that is substantially straight and hollow, having a lumen of a section that is advantageously circular and identical to that of said secondary nozzle 33A. In turn, said arm 33AA cooperates in a mechanical pivot connection with a second distal part of the means 34D to distribute a compressed fluid. The two secondary nozzles 33A and 33B, as is shown in FIG. 5 in particular, can thus advantageously be arranged mirroring one another, on either side of a median plane of the propulsion device 30, substantially separating it into two halves of similar respective volumes and/or weights. The means 34D for distributing the pressurized fluid may advantageously consist of a substantially "Y"-shaped or "T"-shaped hollow structure. In this way, via first and second distal parts that are symmetrical about a longitudinal plane PL of the propulsion device 30, said means 34D may serve the two secondary nozzles 33A and 33B equally via said arms 33AA and 33BA respectively from a single proximal inlet cooperating, in a mechanical embedded connection, with means 34C for collecting said fluid from a remote compression station (not shown in the drawings). As is advantageously suggested in FIGS. 3 and 4, said means 34D may be merged with the beam or the main element 31E of the platform 31, thus only forming a single identical physical entity.

To modify the orientation of each secondary nozzle 33A and 33B in two distinct median planes PMA and PMB respectively, a propulsion device 30 according to the invention comprises two actuators 35A and 35B associated with said secondary nozzles 33A and 33B respectively. As regards the secondary nozzle 33B, FIG. 4A shows an actuator 35B in the form of an electric motor of which an axle driving a cam is visible in FIG. 4A. Said cam cooperates with the arm 35BA, and thus indirectly with the nozzle 33B, via a connecting rod 35BB, the ends of which cooperate with the cam and the arm 33BA respectively via mechanical pivot connections. In this way, a rotation of the shaft of the motor 35B causes a rotation R of the fluid outlet DE33B of the nozzle 33B in a median plane of the propulsion device 30. The second secondary nozzle 33A likewise cooperates, as is suggested in FIG. 5 in particular, with an axle of an actuator 35A via a connecting rod 35AB. Thus, the two secondary nozzles 33A and 33B can be oriented independently of one another under the action of the actuators 35A and 35B while being jointly supplied with pressurized fluid from the means 34D via the respective arms 33AA and 33BA. As will be seen hereinafter, said actuators 35A and 35B are controlled by a processing unit 37 responsible for ensuring total control of the attitude and trajectories of the propulsion device 30, by making joint use of control instructions and of measurements from sensors. For this purpose, each actuator 35A or 35B, or more generally each secondary nozzle 33A or 33B, is associated with a sensor, not shown in the drawings, responsible for outputting said processing unit 37 with a digital or analog representation of the angular position of the fluid ejection direction DE33A or DE33B. Further sensors, such as an accelerometer, a gyroscope and/or even an altimeter, can be made use of to inform said processing unit 37 as to the movements or relative position with respect to the surface of the water above or from which the propulsion device 30 progresses. One or more other sensors can also measure the pressure of the pressurized fluid circulating in the distribution means 34D and transmit a representation of said measurement to said processing unit 37. A processing unit 37 of this type may further control the actuator 51 of a fluid outlet 50, if one of the main nozzles 32 or secondary nozzles 33A, 33B comprises some of these to regulate the thrust force supplied by said nozzle. Finally, as is shown in FIGS. 3 to 9, a device of this type may comprise a man-machine interface 36 of the bicycle handlebar type, having two preemption surfaces or grips 36A and 36B for translating a gesture made by a user U1 of said propulsion device into trajectory instructions. An interface 36 of this type may be mounted movably about a substantially median axis AM, like a handlebar of a motorized watercraft, or else substantially stationary and associated with a sensor 36S (not shown in FIG. 3), said sensor 36S being responsible for measuring the rotational strain or torque about said median axis AM, applied via the grips 36A and 36B by the passenger U1 seeking to move said handlebar and to translate said torque into an orientation instruction. A handlebar 36 of this type may be associated with a plurality of secondary man-machine interfaces such as command levers 38A and 38B, as is shown by way of non-limiting example in FIG. 5, to express a fluid compression power instruction or even a change-of-altitude instruction, known as a "trim" instruction. The invention is not intended to be limited to only these examples of sensors and/or man-machine interfaces as described in FIGS. 3 to 6. Other man-machine interfaces that make it possible to output or provide a piece of visual, vibratory or acoustic information for the attention of the passenger U1, as to the broad operation of the propulsion device 30, could be associated with and advantageously arranged on said handlebar 36 or on any other part of said propulsion device 30 under the condition that the piece or pieces of information output by interfaces of this type, in the forms non-exclusively of a light source, loudspeaker, vibrator etc., can be accessible to one of the senses of the user U1.

The thrust unit responsible for moving said propulsion device 30 may comprise, as well as the secondary nozzles 33A and 33B of said propulsion device, a main nozzle 32 that cooperates with the platform 31 and the means 34D for supplying the pressurized fluid, or, as shown in particular in FIGS. 3 and 4, advantageously directly with the means 34C for collecting the pressurized fluid. A main nozzle 32 of this type basically ensures the propulsion function, the secondary nozzles being positioned laterally, in other words on either side of a median plane PM of the propulsion device 30, and thus mainly responsible for orienting the trajectories of said device 30 and for controlling the attitude thereof. According to FIGS. 3 to 9, the main nozzle 32 is positioned at the stern 31S of the propulsion device 30, the fluid outlet DE32 of which is oriented from the bow 31P, in other words the front, towards said stern 31S, in other words the rear, of said platform 31. An orientation of this type advantageously contributes to the movement substantially parallel to the surface of the fluid above which the propulsion device 30 according to the invention progresses. In a variant or in addition, a propulsion device of this type may comprise a plurality of main nozzles.

As is shown in the non-limiting example shown in FIG. 3, said main nozzle 32 may be fixed in an embedded mechanical connection, by any means, to the body or to the platform 31 of the propulsion device 30 or to the means for collecting the pressurized fluid 34C. An embedded connection of this type makes it possible in particular for the main nozzle 32 to be able to remain integral with the platform 31 and for no relative movement to be made possible between said main nozzle 32 and said platform 31. In another variant, the fluid outlet of said main nozzle 32 could be mounted movably with respect to the platform 31. In all cases, the fluid outlet direction DE32 of a main nozzle 32 is located in a median plane PM, said median plane PM comprising a longitudinal axis AL of said propulsion device 30. As is shown in FIG. 4, the fluid is thus expelled from the main nozzle 32 at an angle α to a longitudinal axis AL. The angle α between the fluid expulsion direction DE32 and said longitudinal axis AL is advantageously between 0° and +45° so as to ensure rapid and optimum movement as close as possible to the fluid surface and to enable total freedom of use of the propulsion device 30. When the value of the angle α is substantially zero, the fluid outlet direction DE32 is substantially coincident with the longitudinal axis AL. When said angle α is larger, said fluid ejection direction DE32 is oriented in the direction of the fluid surface above which said propulsion device 30 is progressing. The angle α may be fixed or, in a variant, be controllable, via an actuator (not shown in FIGS. 3 to 9), from the processing unit 37.

Moreover, the main nozzle 32, advantageously formed from a hollow, curved body, may have a lumen of a section that is substantially circular or advantageously oblong as shown in FIGS. 3 and 4. The term "oblong" designates an elongate shape, longer than it is wide and having rounded angles. In particular, for the same compression station power, this configuration allows a reduction in the pressure losses within the propulsion device 30 and an increase in the performances of a propulsion device 30 of this type.

Figure 11A:
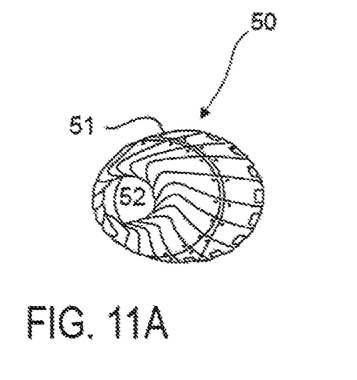
FIGS. 11A and 11B are views of a nozzle fluid outlet of adjustable diameter.
Figure 11B:
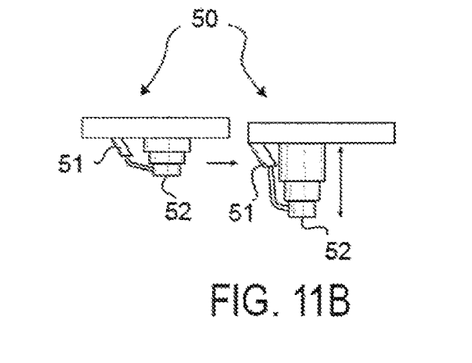

Moreover, in a variant or in addition, in accordance with an embodiment described in connection with FIGS. 11A and 11B, the main nozzle 32 and/or one of the secondary nozzles 33A, 33B of said propulsion device 30 may each comprise a fluid outlet 50, having a lumen of adjustable diameter. The use of said fluid outlet 50 is found to be particularly advantageous since it makes it possible to adjust the diameter of the lumen 52 selectively, thus to impact the circulation speed of the fluid in the nozzle, and ultimately to regulate the thrust force provided by said nozzle. In accordance with drawings such as FIGS. 11A and 11B, a fluid outlet 50 of this type may comprise constriction means or diameter reduction means, such that, by way of non-limiting example described in connection with FIGS. 11A and 11B, an adjustable conical diaphragm (also known by the term "iris") or any other equivalent element acting as a running knot that compresses and releases a flexible segment of the fluid outlet to modify the diameter of the lumen 52 of the fluid outlet 50. However, the invention is not intended to be limited to only these arrangements of constriction means or diameter reduction means of a fluid outlet 50. To implement the constriction means or diameter reduction means of a fluid outlet 50 of this type, it may comprise an actuator 51 that cooperates with said constriction means.

It may be noted that, unlike some known propulsion devices, for which the nozzles of the thrust unit are necessarily positioned above said center of gravity to eliminate any physical effort of the passenger, who has the impression of being "carried" by a virtual crane hook, to the detriment of said passenger's ability to move, the main and secondary nozzle(s) of the thrust unit of a propulsion device 30 according to the invention are positioned below said center of gravity. The propulsion device 30 thus retains all degrees of freedom of movement and, as a result of particularly innovative assistance, which is potentially disengageable on demand or on express authorization output by a processing unit 37, the mode of operation of which will be studied in greater detail in connection in particular with FIG. 10, the passenger U1 and/or U2 instinctively has the impression of controlling his propulsion device 30 very naturally, without any effort or danger. Thus, the agility or inherent physique of the passenger is no longer a criterion for success and achievement. The sensations and pleasure provided are preserved, whilst providing high safety and incredible simplicity of use starting from the first minutes.

Figure 6:
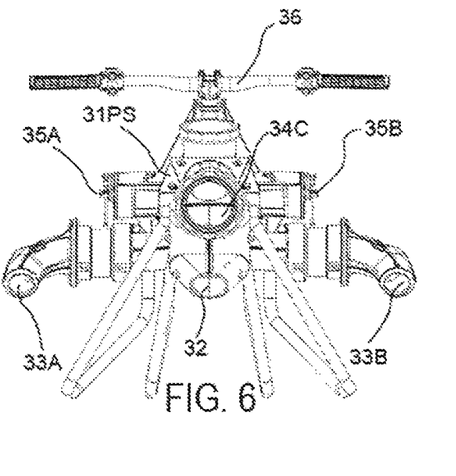
Figure 7:
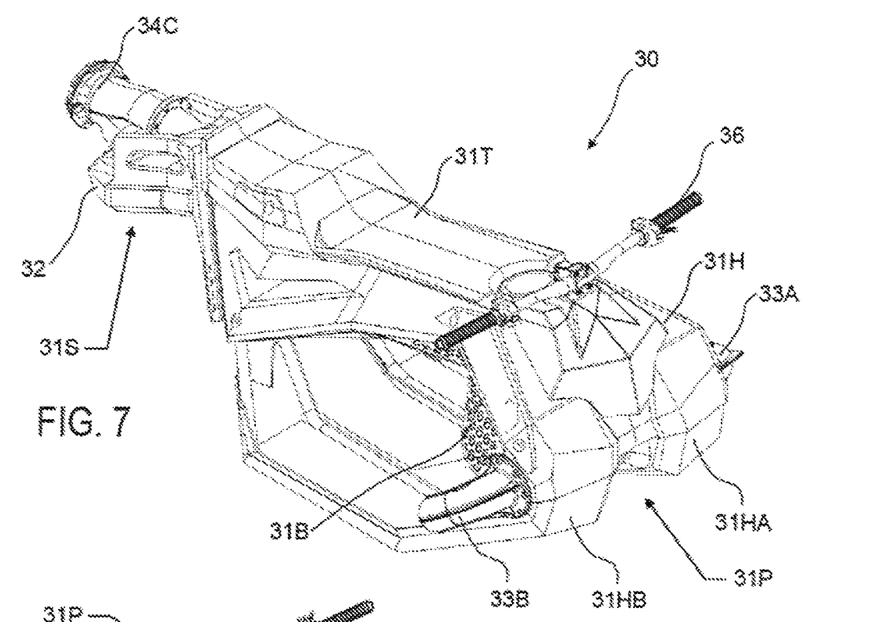
FIGS. 7 and 8 are perspective views of a preferred but non-limiting embodiment of a propulsion device comprising a fairing according to the invention.
Figure 8:
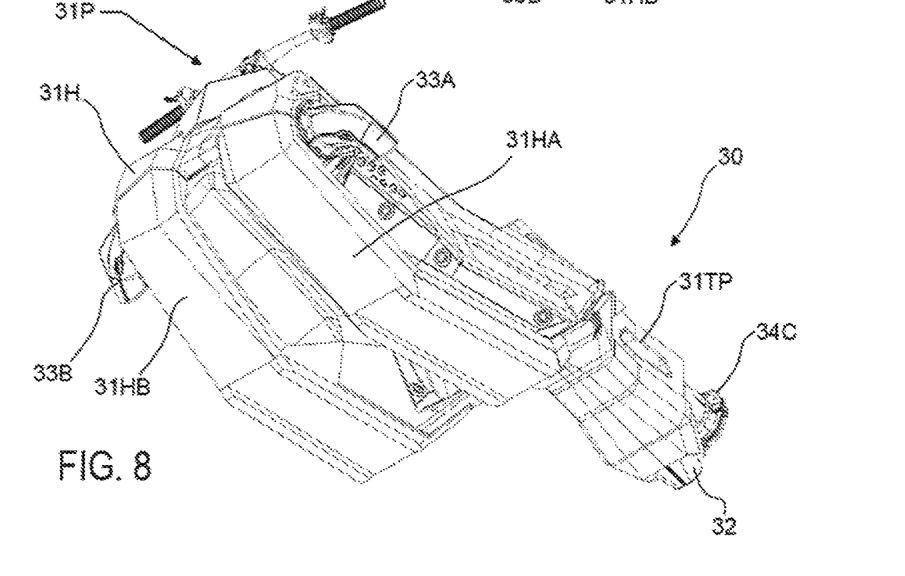
Figure 9:
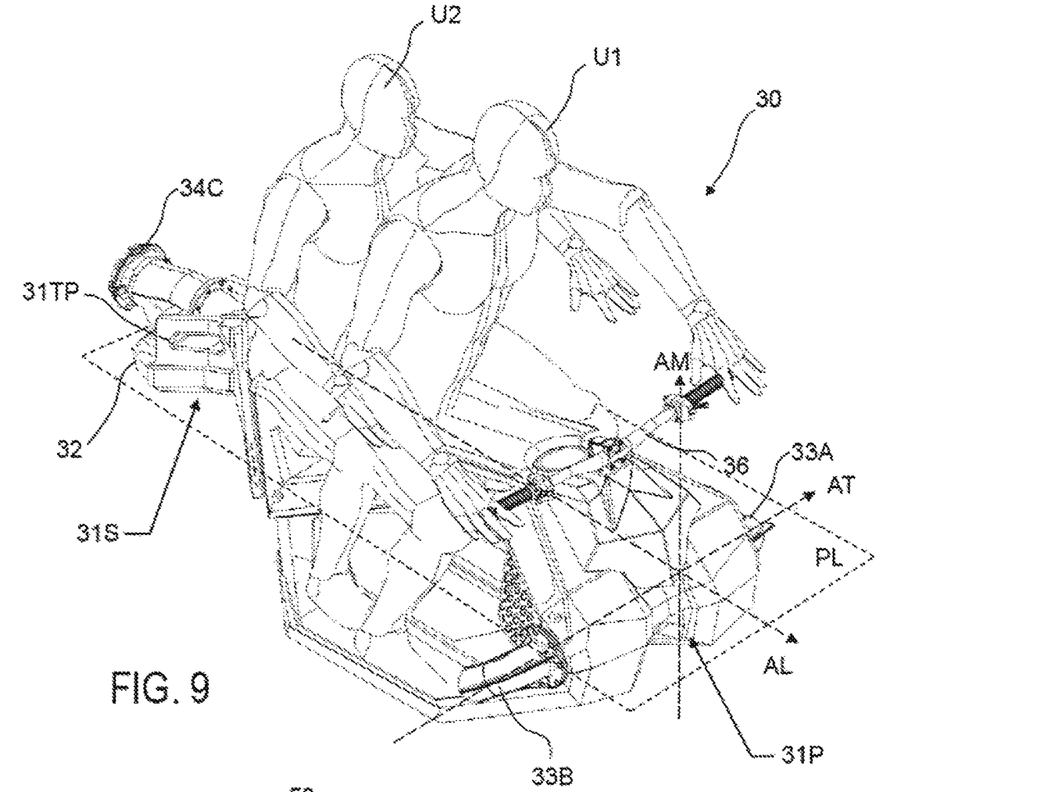
FIG. 9 shows a preferred but non-limiting embodiment of a propulsion device according to the invention carrying two passengers.

To form a body for the platform 31 of a propulsion device 30 according to the invention, said device advantageously comprises, as shown in FIGS. 7 and 8, a fairing 31H composed of one or more elements. According to the non-limiting example described in connection with said drawings, a fairing of this type envelopes both the platform 31 and the means 34D for distributing pressurized fluid, with the exception of the secondary nozzles, in such a way that these remain perfectly movable in rotation R as described previously in connection with FIGS. 4 and 4A. Moreover, a fairing of this type does not envelope the main nozzle 32 and the means for collecting said pressurized fluid 34C, which, as shown in FIGS. 3 and 6, consist of a lumen of circular section arranged to receive the distal part 2a of a pressurized fluid supply duct 2 responsible for conveying said fluid from a remote compression station (not shown in the drawings). The man-machine interfaces 36, 38A, 38B that allow the main passenger U1 to instruct the processing unit 37 also emerge from said fairing 31H. Said unit is protected from any contact with the liquid medium in which or above which the propulsion device 30 is intended to progress. Protection of this type may consist of a tight chamber within which the sensitive electronic parts are integrated. Moreover, the fairing 31H advantageously offers, as is shown by the non-limiting example illustrated in FIG. 7, a seat or saddle. This may be relatively similar to that with which a motorized watercraft for example is equipped. In this way, as is shown in FIG. 9, one or even two users U1 and U2 may position themselves on said device 30. To protect in particular the feet of the passenger or passengers U1, U2, the fairing 31H is jointly arranged with the platform 31, more specifically with the tubular structure 31F, to describe two lower longitudinal U-shaped supports 31HA and 31HB, which advantageously have a planar central section intended to receive one of the feet of one of the passengers U1 or U2. Other configurations of said fairing are also conceivable. The configuration described in FIGS. 7 and 8 makes it possible in particular to reduce the underwater volume and area when the propulsion device is partially underwater, like a catamaran. Moreover, each foot support thus formed has a portion tilted towards the bow 31P so as to reduce any shocks when the propulsion device 30 strikes the surface of the liquid above which it progresses or during any landing.

The fairing 31H may advantageously be formed from one or more materials having, alone or in combination, sufficient rigidity to support the weight of the passenger or passengers U1 and U2 and thus to prevent any excessive deformation of said fairing during the use of the propulsion device 30. It is possible to use woven glass or carbon fibers, mixed with one or more resins, or more generally any other suitable material that is inert in contact with a fluid.

One of the objects of a propulsion device 30 according to the invention is to make it possible for everyone to be able to progress easily on the surface of a fluid, such as the surface of a sea or a lake. For this purpose, a passenger U1 or U2 has to be able to position himself on said device 30, as shown in FIG. 9, while said device is positioned in said fluid, in other words partially underwater. A device of this type thus has to comprise buoyancy elements 31B, arranged so as to keep the bow 31P of said device 30 above water when said device is positioned on the surface of a fluid and a passenger U1 has an average build, in other words weighs approximately eighty to a hundred kilograms. Buoyancy elements 31B of this type may be formed from one or more materials such as, by way of non-limiting example, a syntactic foam or a polyurethane foam. An arrangement of this type facilitates the "take-off" step while providing optimum balance for the passenger.

The fairing 31H may comprise openings passing through the wall of the fairing, the respective, advantageously conical lumens of which have longitudinal axes substantially parallel to a median axis AM of the propulsion device 30, and of which the upper lumen ends have sections of dimensions less than those of the lower ends of said lumens. In this way, the fluid within which a propulsion device 30 is partially underwater may easily be evacuated under gravity, thus rapidly lightening the weight of said propulsion device 30 in the take-off phase. Said fairing 31H may further comprise openings or protuberances 31TP, offering a passenger U1 or U2 preemption ranges so as to keep himself on the propulsion device 30 while it is progressing. FIGS. 8 and 9 thus illustrate a lateral opening 31TP formed in the fairing 31H, towards the bow 31S, allowing a passenger U2 to hold on to the device 30 if necessary.

In order for the propulsion device 30 potentially advantageously to be able to provide the user thereof with particularly innovative assistance, although this is potentially disengageable on demand or on express authorization, a functional architecture is now examined, in connection with a non-limiting example shown in FIG. 10, in which different parts for instructing and/or controlling the operation of said propulsion device make it possible to implement a method for controlling secondary nozzles of said propulsion device 30, thus assisting or even controlling the trajectories, attitudes and altitudes in response to instructions from the user, or even from a third party remote from said propulsion device 30, such as an instructor for example, said instructions being filtered in relation to a personalizable operating context depending on the embodiment of a propulsion device 30 of this type according to the invention, so as only to maintain and only to translate into commands those instructions which are considered relevant by the processing unit 37 of said propulsion device 30.

In connection with FIGS. 5 and 10, a propulsion device 30 of this type providing automatic assistance to its user comprises a processing unit 37 in the form of one or more microcontrollers or processors, or even digital-analog signal converters. Said processing unit 37 is in particular responsible for outputting control commands CdA and CdB of the actuators 35A and 35B, moving in rotation the secondary nozzles 33A and 33B respectively associated with said actuators 35A and 35B. To output control commands CdA and CdB of this type, they have to be generated by implementing a method for controlling said secondary nozzles. The implementation of a method of this type, of which the main steps S11, S12, S20, S31 and S32 are shown in FIG. 10, by the processing unit 37 can advantageously be caused by interpreting or executing instructions of a computer program product P of which said instructions have been loaded or written beforehand to a program memory 37MP that cooperates, via a wired communication bus or by coupling, with said processing unit 37. A processing unit 37 of this type may further, like the program memory 37MP, comprise or cooperate with a data memory 37DM for collecting data supplied by other parts, for example sensors and/or man-machine instruction interfaces, before or after processing by the processing unit 37. A data memory 37DM of this type may further record one or more configuration parameters limiting the degrees of freedom that it is desired to grant to the user U1 controlling the propulsion device 30. By way of non-limiting example, configuration parameters of this type may determine a baseline, for example, in the form of a maximum altitude and/or propulsion speed, relating to a passenger U1 of average build controlling said propulsion device 30.

As noted previously in connection with FIGS. 3, 5 and 6 in particular, said user U1 may inform the processing unit 37, for example using a determined gesture, of a desire to change trajectory or altitude. For this purpose, the propulsion device 30, in a preferred embodiment of the invention described in connection with said FIGS. 3, 5 and 6, comprises a first man-machine interface in the advantageous form of a motorized water vehicle or bicycle handlebar. The rotational path or the torque applied to said handlebar 36 by the controlling user U1 may be measured by a suitable sensor 26S, for example an inductive sensor advantageously using the Hall effect, a sensor of this type being particularly precise as a result of the function thereof of amplifying the measurement signal, thus limiting any sound from the environment. A signal C36 supplied by a sensor 36S of this type may be considered to express a change-of-direction instruction in the form of an angular position, such as to cause a roll resulting from a change in trajectory for a given altitude. Said handlebar 36 may further comprise two other man-machine instruction interfaces 38A and 38B, for example in the form of levers or buttons, in order for a user U1 to be able to inform of or instruct a desired increase or desired decrease respectively in the compression power of the remote fluid compression station, supplying said propulsion device 30 with pressurized fluid, and a desired increase or decrease in altitude with respect to a determined nominal cruising altitude, as a result of a configuration parameter recorded in a data memory 37DM or program memory 37PM. Levers 38A and 38B of this type may, like the path of the handlebar 36, be associated with sensors 38BS and 38AS respectively, for example Hall effect sensors. The sensor 38BS may be arranged to output a signal C38B expressing a magnitude of increase and/or decrease of the compression power of the remote compression station 40. The sensor 38AS may be arranged to output a signal C38A expressing a change-of-altitude or "trim" instruction with respect to the nominal or "cruising" altitude, for example in the form of an angular position such as to cause a pitch resulting from a change in altitude with respect to a given substantially horizontal nominal attitude. In a variant and/or in addition, other sensors could be associated with other man-machine instruction interfaces. Interfaces of this type could themselves directly output data or signals characterizing instructions from the user of the propulsion device 30. To lock in the current attitude and/or trajectory with respect to a nominal attitude and trajectory, the processing unit 37 advantageously cooperates, in a wired or wireless manner, with one or more sensors 39, advantageously a set of sensors, such as gyroscopes, on three axes, making it possible to define at each moment the current position in space of a propulsion device 30 according to the invention, as a result of the accelerations and magnetic fields that it experiences. A preferred set of sensors of this type, with which for example aircraft are equipped, is known by the acronym AHRS, for the term "attitude and heading reference system," or else by the term "inertial unit." Said set of sensors 39 uses vibrations that make it possible to measure changes in direction or else the acceleration due to gravity to give a vertical reference. Sensors 39 of this type thus output two types of signals or data C39r and C39p, respectively expressing a measurement of the roll and a measurement of the pitch, said roll and pitch being described by the propulsion device 30.

Knowing the measurements of the roll and pitch of the propulsion device as well as a "trim" or change-in-direction instruction, the processing unit 37 can implement a method for controlling the secondary nozzles 33A and 33B to try to bring said propulsion device 30 towards a substantially horizontal attitude and a rectilinear direction. A roll may thus be seen as an angular position error described by the attitude of a longitudinal plane PL of said propulsion device 30 about a longitudinal axis AL of the propulsion device 30. Thus, the processing unit 37 can implement a step S11 to generate a command Cr to cause a shift in relative position in the secondary nozzles 33A and 33B, such as to itself cause a change in direction and thus automatically to correct the current attitude. The command Cr may advantageously be generated by implementing, in a step S11, a PID (proportional integral derivative) corrector, thus enabling automatic lock-in of the attitude of the propulsion device 30, taking as an input or instruction, on the one hand, the instruction C36 describing a position of the handlebar 36 or a torque applied thereto, translated by the sensor 36S into an angular position in relation to said longitudinal axis AL with respect to an attitude of a longitudinal plane PL of said propulsion device that is substantially horizontal, and, on the other hand, the signal or data C39r expressing a roll measurement supplied by the sensor 39. Any other function or algorithm could be implemented in a variant of or in addition to step S11.

Moreover, a pitch may be seen as an angular position error described by the attitude of a longitudinal plane PL of said propulsion device 30, about a transverse axis AT of said propulsion device 30 with respect to a substantially horizontal attitude. The same applies to a change-of-altitude instruction, which can be seen as an angular position error in relation to the current attitude about a transverse axis AT of said propulsion device 30. Thus, the processing unit 37 can implement a step S12 to output a command Cp to modify an average position of the secondary nozzles such as to cause a change in altitude and thus to correct the current attitude. The command Cp may advantageously be generated by implementing, in step S12, a PID (acronym for "proportional integral derivative") corrector, thus making it possible to lock in the altitude PL of the propulsion device 30 taking as an input, on the one hand, the instruction C38A, describing a position of the lever 38A translated by the sensor 38AS into an angular position in relation to said transverse axis AT with respect to an attitude of a substantially horizontal longitudinal plane PL, and, on the other hand, the signal or data C39p expressing a pitch measurement supplied by the sensor 39. Any other function or algorithm could be implemented in a variant of or in addition to the step S12.

So as automatically to correct, in other words in some way move towards canceling, the roll and pitch phenomena while integrating any change-of-direction and/or change-of-altitude instructions transmitted by the user U1, the method for controlling the secondary nozzles 33A and 33B implemented by the processing unit 37 further comprises a step S20 for producing instructions CMA and CmB for controlling the respective nozzles 33A and 33B. By way of non-limiting example, a step S20 of this type may advantageously consist in producing the command CmA for controlling the secondary nozzle 33A, in other words the secondary nozzle 33A mounted rotationally about a transverse axis AT and positioned to port from the propulsion device 30 described in connection with FIG. 3, by adding the command Cr to cause a shift in relative position of the secondary nozzles 33A and 33B and the command Cp to modify an average position of the secondary nozzles. Said step S20 may further advantageously consist in producing the command CmB for controlling the secondary nozzle 33B, in other words the secondary nozzle 33B mounted rotationally about a transverse axis AT and positioned to starboard from the propulsion device 30 described in connection with FIG. 3, by subtracting the command Cr to cause a shift in relative position of the secondary nozzles 33A and 33B from the command Cp to modify an average position of the secondary nozzles 33A and 33B.

So as ultimately to control the actuators 35A and 35B moving said secondary nozzles 33A and 33B, while jointly taking account of the current positions of said secondary nozzles 33A and 33B and of said respective control commands CmA and CmB of said secondary nozzles 33A and 33B that were generated beforehand in step S20, the control method, implemented by the processing unit 37 and described in connection with FIG. 10, may advantageously comprise two steps S31 and S32 for outputting commands CdA and CdB respectively, for example speed or position commands, depending on the type of actuator under consideration, to actuators 35A and 35B responsible for moving the secondary nozzles 33A and 33B in rotation about a transverse axis AT of said propulsion device 30.

By way of preferred and non-limiting example, the step S31, for delivering the command CdA of the actuator 35A controlling the secondary nozzle 33A positioned to port from the propulsion device 30, may consist in locking in said actuator 35A by implementing a PID corrector that takes as an input, on the one hand, the angular measurement MA of an axis of said actuator 35A and/or of the angular position of the nozzle 35A with respect to a given baseline, supplied by the sensor 39A, and, on the other hand, said control command CmA generated previously in step S20.

In turn, step S32, which is simultaneous with the step S31 described previously, for outputting the command CdB of the actuator 35B controlling the secondary nozzle 33A positioned to starboard from the propulsion device 30, may consist in locking in said actuator 35B by implementing a PID corrector that takes as an input, on the one hand, the angular measurement MB of an axis of said actuator 35B and/or of the angular position of the nozzle 33B with respect to a given baseline, supplied by the sensor 39B, and, on the other hand, said control command CmB generated previously in step S20.

The example thus described of a method for controlling the secondary nozzles could comprise other intermediate steps to take account of other measurements, such as the pressure of the fluid supplying the thrust unit 32, 33A and 33B of said propulsion device 30 or other additional instructions, such as an instruction to modify the altitude and/or the incidence of the nominal attitude.

It may be noted that, in the absence of any change-in-direction and/or change-in-altitude instruction instructed by the user, implementing the control method of the secondary nozzles makes it possible automatically to compensate any pitch and/or any roll, thus providing unequalled control assistance and comfort for the passenger or passengers.

Moreover, a propulsion device 30 as described in connection with FIGS. 3 to 10 may comprise an instruction interface 38B that makes it possible to modify the compression power of the remote compression station 40 supplying the propulsion device 30 with fluid via the duct 2. By way of non-limiting example, the treatment unit 37 may further take account of the instruction C38B of the user U1 via the interface 38B, expressed by the associated sensor 38BS, of a potential nominal power determined by a configuration parameter, to output a command signal Cd40 for the compression power of the remote station 40. This type of production of a command signal may be similar to that which is already known in connection with the propulsion device 20. A command of this type may be transmitted through the air, in other words through wireless communication, or in a variant by wire, via suitable communication means 37C that cooperate with the processing unit 37.

A take-off phase and, to a lesser degree, a landing phase, may be difficult for an inexperienced or beginner user U1 of a propulsion device 30. For this purpose, the invention provides that a propulsion device 30 as described previously can provide particularly valuable automatic assistance during these critical phases.

Thus, to prepare for take-off, a passenger U1, or even a second passenger U2, first has to position himself on the seat 31T. Once the propulsion device 30 is partially underwater and the motor of the remote compression station is idling, although the buoyancy means 21B help said passenger or passengers U1 and/or U2 to maintain their positions on the seat 31T, some may find the balance of the boarding before take-off to be precarious or intimidating. As soon as the passenger/pilot U1 lightly actuates a man-machine instruction interface, for example the interface 38, or the gas throttle, in other words the interface that makes it possible to regulate the power of the remote compression station, or else as soon as the attitude of said propulsion device is suddenly modified by the arrival of a passenger, the processing unit 37 can provide, for a determined, parameterizable duration, for example for approximately twenty seconds, automatic assistance that provides excellent stabilization of the propulsion device 30. A result of this type can be obtained and caused by the processing unit 37 by acting jointly on the fluid compression power of the remote compression station and on the orientation of the secondary nozzles. For this purpose, it is necessary for said processing unit 37 to be able to take into consideration the pressure of the fluid circulating in the means 34D for supplying said fluid to the main and secondary nozzles. This information may be supplied by one or more sensors, not referenced in FIGS. 3 to 9, as noted previously. Said fluid pressure will thus form, for the processing unit 37, a parameter for adjustment of the functions implemented in steps S11, S12, S31 and/or S32, which are described in connection with FIG. 10. Indeed, when the pressure of the fluid supplying the thrust unit of the propulsion device is low, it is appropriate to increase the sensitivity of the method for controlling the secondary nozzles, so as to "overcorrect" the pitch and/or the roll. By contrast, when the pressure of said fluid is high, for example when a cruising trajectory has been reached, the sensitivity of said process for controlling the secondary nozzles can be reduced, so as to limit the perception for the passenger U1 of sudden, excessive corrections to said roll and pitch.

Returning to the assisted take-off phase, when said passenger/pilot U1, while actuating the interface 38 moderately, for example within a predetermined threshold, or else any other interface potentially dedicated to this purpose, is ready to take off, the processing unit 37 implements the method for controlling the secondary nozzles 33A and 33B and automatically triggers an increase in the compression power of the remote station. Said power becomes sufficient for the propulsion device 30 to rear up and emerge totally until it reaches a pitch, for example, in a non-limiting manner, of approximately 10° to 15° with respect to the horizontal. At this stage, the assisted take-off phase is terminated and the method for controlling the secondary nozzles recovers its nominal operation.

The attitude of the propulsion device 30 thus rapidly, in other words in a few seconds, recovers partial or complete horizontality. The invention provides that in this step an output interface can emit, for example, a characteristic long sound and/or first light signal. An acoustic and/or visual or even vibratory response of this type can be caused by the processing unit 37 that implements the method of controlling the secondary nozzles. A signal of this type warns the passenger U1 that he currently has the full range of control commands available.

In a variant and/or in addition, automatic assistance of this type may provide that the method for controlling the nozzles causes the output of a second acoustic, visual or vibratory signal, distinct from the preceding one, for example a characteristic discontinuous sound and/or light signal, alerting said passenger/pilot U1 of non-adherence to a safe, controlled take-off procedure. A situation of this type may result from excessive and premature application of the gas command, via the interface 38B for example, or of an attempt at one or more desired changes in trajectory that are too marked and/or untimely, via the interface 36 for example, during the assisted take-off phase. This second signal thus warns said incautious user U1 that he will only be in possession of the commands when he has reduced his request for compression power of fluid supplying the thrust unit of the propulsion device 30 or his application of the handlebar 36 within one or more predetermined thresholds. In anticipation, the propulsion device, under the action of the processing unit 37, follows a low-speed displacement at an altitude and attitude that are determined and safe by default.

As regards landing, the invention likewise provides that the method of controlling the secondary nozzles can automatically assist the user U1 during a landing request. Said request may be detected by the processing unit, for example, subsequent to a release for a determined duration, a situation generally known as "dead man's control," of the gas command, via the interface 38B for example. In this case, in order for the propulsion device 30 not to end up colliding potentially violently, out of control, with the surface of the traveled fluid, the processing unit 37, via the implementation of a method for controlling secondary nozzles according to the invention, transmits a command to reduce the compression power of the fluid supplying the thrust unit to the remote compression station, and controls the secondary nozzles 33A and 33B so as first to recover an altitude and speed of displacement corresponding to those reached at the end of the assisted take-off phase, and then to cause a smooth landing.

The assisted take-off and/or landing phases are obviously optional. The implementations thereof can result from parameterization of the operation of the method for controlling the secondary nozzles according to the invention.

The embodiment described in connection with FIG. 10 of a propulsion device 30 can advantageously make it possible for a remote instructor, for example positioned on the compression station 40 or on a quay or even on a nearby vessel, to control the progression of the propulsion device 30 instead of the user U1. For this purpose, the communication means 37C can receive a priority command message C40, which can be interpreted by the processing unit 37 of the propulsion device 30. A priority command message C40 of this type may comprise and convey control instructions similar to the instructions C36 and C38A mentioned previously. Said instructions conveyed by said message C40 will, once said message C40 is received, be taken into consideration by the method for controlling the secondary nozzles as described previously in place of those generated via the interfaces 36 and 38A. Thus, an instructor can intervene on demand and unexpectedly during the progression of a beginner passenger U1.

Moreover, the processing unit 37 may comprise or cooperate with one or more electric power sources 37PS, responsible for supplying the active elements, the processing unit itself and/or sensors or actuators with electricity.

Finally, the invention provides that the processing unit 37 can record a history of the control instructions and/or commands generated, or even of the localization data potentially supplied by the sensor 39, for purposes of monitoring or controlling the use of a propulsion device 30 according to the invention. A history of this type may be saved in the data memory 37DM and be read-accessible from a communicating electronic object, for example a personal computer, a smartphone or an interactive tablet for consultation. A communication of this type may further make it possible to modify the program P written to the program memory 37PM and/or some configuration parameters saved in said data memory 37DM, so as to modify, on demand, the behavior of the propulsion device 30 and the automatic assistance output thereby. It is thus possible to modify some or all of the instructions and/or parameter data used by the program product P that causes the implementation of the method for controlling the secondary nozzles by the processing unit 37. A communication of this type can be implemented via the communication means 37C mentioned previously or via other means and optional communication terminals dedicated to this purpose.

The invention has been described when it is implemented on the surface of and/or in water. It may equally be implemented on the surface of any suitable fluid and more particularly in the air.

Other modifications are conceivable without going beyond the scope of the present invention as defined by the accompanying claims.

The invention claimed is:

1. Propulsion device comprising:
   a platform;
   at least two nozzles supplied with pressurized fluid, said nozzles being mounted movably, each about a transverse axis of said propulsion device, said axis being normal to a first median plane of the propulsion device, said first median plane separating a left half from a right half of said propulsion device, to deliver said pressurized fluid in respective fluid directions lying in distinct second median planes, parallel to said first median plane of the propulsion device; and
   an actuator associated with each nozzle that causes a rotation, about a transverse axis of the propulsion device, of the fluid expulsion direction of the respective nozzle in one of said second median planes;
   wherein the actuators that are respectively associated with the nozzles are controlled by electric commands, said propulsion device further comprising a processing unit designed to generate said electric commands from a control instruction and/or from a baseline determined by one or more configuration parameters.

2. Propulsion device according to claim 1, comprising a man-machine interface designed to translate a gesture of a user into:
   a change-of-direction instruction in the form of an angular position with respect to the attitude of the longitudinal plane of the propulsion device about a longitudinal axis of said propulsion device; and/or
   a change-of-altitude instruction in the form of an angular position with respect to the attitude of the longitudinal plane of the propulsion device about a transverse axis of said propulsion device.

3. Propulsion device according to claim 2, wherein the baseline expresses a reference attitude and cruising altitude of a longitudinal plane of the propulsion device, which comprises:
   first and second sensors for measuring the respective angular positions of the secondary nozzles with respect to a reference angular position;
   a third sensor providing a measurement of the roll and/or a measurement of the pitch experienced by said longitudinal plane about a longitudinal axis and a transverse axis respectively of said propulsion device.

4. Method for controlling nozzles of a propulsion device according to claim 3, said method being implemented by the processing unit of said propulsion device, said control method comprising:
   a step for producing a command to cause a shift in relative position of said nozzles from the change-of-direction instruction and from the roll measurement provided by the third sensor of said propulsion device;
   a step for producing a command to modify an average position of said nozzles from the change-of-altitude instruction and from the measurement of the pitch provided by the third sensor of said propulsion device;
   a step for producing:
       a command for controlling a first of the nozzles from a sum of the command to cause a shift in relative position of the nozzles and the command to modify an average position of the nozzles, which were generated beforehand;
       a command for controlling a second of said nozzles by subtracting said command to cause a shift in relative position of the nozzles from said command to modify an average position of said nozzles;
   a step for generating and providing a command that can be interpreted by the actuator associated with the first of said nozzles from the measurement of the angular position of said first nozzle and said command for controlling said first nozzle that was generated previously;
   a step for generating and providing a command that can be interpreted by the actuator associated with the second of said nozzles from the measurement of the angular position of said second nozzle and said command for controlling the nozzle that was generated previously.

5. Control method according to claim 4, wherein one of steps comprises implementing a proportional integral derivative corrector.

* * * * *